US010113005B2

(12) United States Patent
Häggblom et al.

(10) Patent No.: US 10,113,005 B2
(45) Date of Patent: Oct. 30, 2018

(54) METHOD FOR PRODUCING DEWATERED MICROFIBRILLATED CELLULOSE

(71) Applicant: Kemira Oyj, Helsinki (FI)

(72) Inventors: Martin Häggblom, Helsinki (FI); Veli-Matti Vuorenpalo, Espoo (FI)

(73) Assignee: Kemira Oyj, Helsinki (FI)

( * ) Notice: Subject to any disclaimer, the term of this patent is extended or adjusted under 35 U.S.C. 154(b) by 0 days.

(21) Appl. No.: 14/653,417

(22) PCT Filed: Dec. 19, 2013

(86) PCT No.: PCT/FI2013/051184
§ 371 (c)(1),
(2) Date: Jun. 18, 2015

(87) PCT Pub. No.: WO2014/096547
PCT Pub. Date: Jun. 26, 2014

(65) Prior Publication Data
US 2015/0322170 A1 Nov. 12, 2015

(30) Foreign Application Priority Data

Dec. 20, 2012 (FI) ...................................... 20126341

(51) Int. Cl.
C08B 15/02 (2006.01)
C08L 1/02 (2006.01)

(52) U.S. Cl.
CPC ................ *C08B 15/02* (2013.01); *C08L 1/02* (2013.01)

(58) Field of Classification Search
CPC ....................................................... C08B 15/02
See application file for complete search history.

(56) References Cited

U.S. PATENT DOCUMENTS

| 4,043,049 | A |  | 8/1977 | Hedstrom |
| 4,304,050 | A |  | 12/1981 | Morud |
| 2004/0203308 | A1 |  | 10/2004 | Ko et al. |
| 2005/0272926 | A1 | * | 12/2005 | Lee ........................... C08B 1/00 536/56 |
| 2008/0193590 | A1 |  | 8/2008 | Lundberg |
| 2010/0065236 | A1 | * | 3/2010 | Henriksson ............ D21C 9/002 162/174 |
| 2012/0298319 | A1 |  | 11/2012 | Fujiwara |
| 2014/0329094 | A1 | * | 11/2014 | Vehniainen ............... D21C 9/18 428/402 |
| 2015/0044468 | A1 | * | 2/2015 | Auer ......................... C22B 7/04 428/402 |

FOREIGN PATENT DOCUMENTS

| CN | 101941787 B |  | 12/2011 |
| EP | 0120471 A1 |  | 10/1984 |
| EP | 0947549 A1 |  | 10/1999 |
| JP | 2010240513 A |  | 10/2010 |
| JP | 2012001626 A |  | 1/2012 |
| JP | 2012036517 A |  | 2/2012 |
| WO | 2010102802 A1 |  | 9/2010 |
| WO | 2012156880 |  | 11/2012 |
| WO | 2012156882 A1 |  | 11/2012 |
| WO | WO 2013/121083 | * | 8/2013 |
| WO | WO 2013/135239 | * | 9/2013 |

OTHER PUBLICATIONS

Biodegradable Cellulose-based Hydrogels: Design and Applications Alessandro Sannino et al. Materials, vol. 2, pp. 353-373, 2009.*
Superabsorbent hydrogels based on cellulose for smart swelling and controllable delivery Chunyu Chang et al. European Polymer Journal, vol. 46, pp. 92-100, 2010.*
Dewatering of Biological Slurry by Using Water-Absorbing Polymer Gel Xia Huang et al. Biotechnology and Bioengineering, vol. 34, pp. 102-109, 1989.*
International Search Report for PCT/FI2013/051184 dated Mar. 6, 2014.
Office Action from the National Board of Patents and Registration of Finland for 20126341 dated Oct. 16, 2013.
English translation of the Abstract for EP 0120471 published on Oct. 3, 1984.
Yucheng Peng et al: "Drying cellulose nanofibrils: in search of a suitable method", Cellulose, Kluwer Academic Publishers (Dordrecht), NL, vol. 19, No. 1, Dec. 2, 2011 (Dec. 2, 2011), pp. 91-102, XP019998791, ISSN: 1572-882X, DOI: 10.1007/S10570-011-9630-Z.
English translation of the Abstract for JP 2012001626 published on Jan. 5, 2012.
Henriksson M., et al., "Cellulose nanopaper structures of high toughness", Biomacromolecules, vol. 6, No. 6, s. 1579-1585, published by American Chemical Society on May 23, 2008.

(Continued)

*Primary Examiner* — Douglas B Call
(74) *Attorney, Agent, or Firm* — Berggren LLP

(57) ABSTRACT

The present invention relates to a method for producing dewatered microfibrillated cellulose (MFC) comprising i) providing an aqueous MFC slurry, ii) optionally dewatering said MFC slurry by mechanical means to provide a partly dewatered MFC slurry, and iii) subjecting the MFC slurry or the partly dewatered MFC slurry to one or more drying operations by means of one or more absorbing materials to produce dewatered MFC. The produced MFC can be redispersed in water without deteriorating the material properties of the MFC.

11 Claims, 2 Drawing Sheets

(56) References Cited

OTHER PUBLICATIONS

English translation of the Abstract for CN 101941787 B published on Dec. 7, 2011.
Office Action, Chinese Patent Office, Application No. 201380066792.6, dated Aug. 3, 2016 (also English Translation included).
Office aciton issued by Japanese Patent Office dated Nov. 7, 2017 with English translation.
Office action issued by Russian Patent Office dated Oct. 25, 2017 with English Translation.

* cited by examiner

METHOD FOR PRODUCING DEWATERED MICROFIBRILLATED CELLULOSE

CROSS-REFERENCE TO RELATED APPLICATION

This application is the 35 U.S.C. § 371 national stage application of PCT Application No. PCT/FI2013/051184, filed Dec. 19, 2013, which claims priority to and the benefit of, FI Patent Application No. 20126341, filed Dec. 20, 2012, both of which are herein incorporated by reference in their entirety.

FIELD OF THE INVENTION

The present invention relates to a method for producing dewatered microfibrillated cellulose. The produced microfibrillated cellulose can be redispersed in water without deteriorating the material properties of the microfibrillated cellulose.

BACKGROUND OF THE INVENTION

Microfibrillated cellulose, hereinafter denoted MFC, is also called nanocellulose. MFC is prepared from cellulose source material, usually from woodpulp. The MFC fibrils are isolated from the wood-based fibers using high-pressure homogenizers. The homogenizers are used to delaminate the cell walls of the fibers and liberate the microfibrils and/or nanofibrils. Pre-treatments are sometimes used to reduce the high energy consumption. Examples of such pretreatments are enzymatic/mechanical pre-treatment and introduction of charged groups e.g. through carboxymethylation or TEMPO-mediated oxidation.

The properties of MFC, such as mechanical properties, film-forming properties and viscosity, makes it an interesting material for many applications, such as paper and board manufacturing, oil and mining, composites technology, food industry, pharmaceutical industry, cosmetic applications etc.

Following documents of the prior art relates to the production of MFC:

U.S. Pat. No. 4,483,743 discloses a process for manufacturing microfibrillated cellulose (MFC) by passing a liquid suspension of cellulose through a high pressure homogenizer having a small diameter orifice in which the suspension is subjected to a pressure drop of at least 3000 psig (20670 kPa) and a high velocity shearing action followed by a high velocity decelerating impact, and repeating the passage of said suspension through the orifice until the cellulose suspension becomes substantially stable. The produced MFC has a water retention value of over 280%. The MFC can be used with paper products and non-woven sheets to improve their strength. MFC produced by this type of process typically has a width of about 25-100 nm while the length is much longer.

WO 2007/091942 A1 discloses an improved method for manufacturing microfibrillated cellulose. The disclosed method is said to solve the problems relating to clogging in high-pressure homogenizers and high energy consumption. According to this document microfibrillated cellulose is manufactured by refining a hemicelluloses containing pulp, preferably sulphite pulp, and treating the pulp with a wood degrading enzyme followed by homogenizing the pulp. The enzyme is a cellulase, preferably a cellulase of endoglucanase type which most preferably is a mono-component endoglucanase. The pulp can be refined before or after the enzyme treatment or both before and after the enzyme treatment. The obtained microfibrillated cellulose can be used in food products, cosmetic products, pharmaceutical products, paper products, composite materials, coatings or in rheology modifiers (e.g. drilling muds).

Yet another type of microfibrillated cellulose is described by Wågberg Lars et al., Langmuir 2008, Vol. 24, 2008, pages 784-795. This microfibrilled cellulose was prepared by high-pressure homogenization of carboxymethylated cellulose fibers. The fibers were sulfite softwood-dissolving pulp fibers. The produced MFC typically has a width of about 5-15 nm and a length which can be more than 1 µm.

Also other chemical pretreatment methods are known, such as an oxidation pretreatment of pulp fibers described by Saito et al. in Biomacromolecules, Vol. 8, No. 8, 2007, pp. 2485-2491. The pulp fibers are oxidized with a 2,2,6,6-tetramethylpiperidine-1-oxyl radical (TEMPO)-mediated system followed by mechanical treatment. This oxidation pretreatment converts primary hydroxyl groups of the celluloses to carboxylate groups. The produced nanofibers typically have a width of about 3-4 nm and a length of a few µm.

Following documents of the prior art relate to drying/dewatering MFC or other cellulosic materials:

When increasing the dry content of MFC suspensions, irreversible aggregation phenomenons have been recorded. The main strategy to prevent agglomeration or hornification of MFC has been the introduction of a steric barrier or electrostatic groups to block cooperative hydrogen bonding of the cellulose chains. Among the most useful additives are polyhydroxy-functionalized admixtures, particularly carbohydrates or carbohydrate related compounds, such as glycosides, carbohydrate gums, cellulose derivatives, e.g. CMC, starches, and oligosaccharides. Unfortunately, large quantities of such substances seem to be necessary to prevent hornification. This might severely restrict the final use of the MFC, for example in food applications, composite materials etc.

WO 2012/107642 discloses a method for dewatering an aqueous gel of nanofibrillar cellulose by means of an organic solvent miscible with water. The preferred solvent is ethanol. A dry content of the nanofibrillar cellulose of up to 95% is claimed to be achieved.

WO 2005/028752 discloses a method of making a formed, dried fiber material. The starting material is an aqueous lignocellulose fiber pulp which is dewatered under an effective compression direction and pressure, and then dried in a drying oven at a temperature of 60-120° C. In a preferred embodiment aqueous lignocellulose fiber material is pumped into a formation trough having fixed, non-perforated upper side plates, a removable perforated bottom, a mechanically driven, perforated or solid plunger top and mechanically driven, solid lower side plates, and allowed to dewater.

WO 2011/095335 discloses a method for producing dry microfibrillated cellulose, wherein a mixture of cellulose pulp in a liquid such as ethanol, is subjected to high shear actions to form a MFC slurry, then the ethanol in the MFC liquid is displaced by liquid carbon dioxide under pressure and the liquid carbon dioxide is removed by evaporation to obtain dry MFC.

JP 60186548 discloses a method for dehydrating and drying microfibrilled cellulose by adding to an aqueous suspension of MFC a water-soluble substance, such as glucose or sucrose, in an amount of at least 10% by weight of the solid component of the MFC. The obtained MFC composition is said to have excellent redispersing and suspending properties.

U.S. Pat. No. 4,481,076 describes a method of drying an aqueous suspension of microfibrillated cellulose by suspending the same in a compound capable of inhibiting hydrogen bonding between the fibrils in the cellulose and drying the suspension, preferably at a temperature of 50°-70° C. Preferred compounds are polyhydroxy compounds such as sugars.

The present invention is focussed on solving following problems:

MFC is normally produced in very low solid content, usually at a consistency of between 1% and 6% by weight. Higher solid content is needed for more feasible transportation and further processing.

When increasing the dry content irreversible agglomeration or hornification occurs, which makes redispersion after drying difficult.

Thus, the aim of the invention is to obtain a feasible process which prevents agglomeration during drying, and to obtain a MFC product which has a high solids content and which is redispersible.

SUMMARY OF THE INVENTION

According to the present invention it has been found that the above problems can be solved by subjecting an aqueous MFC slurry to one or more drying operations by means of one or more absorbent materials to produce dewatered MFC. The obtained dewatered MFC can be easily redispersed in water. The used absorbent material can be regenerated and reused as absorbing material.

DETAILED DESCRIPTION OF THE INVENTION

Figure 1:
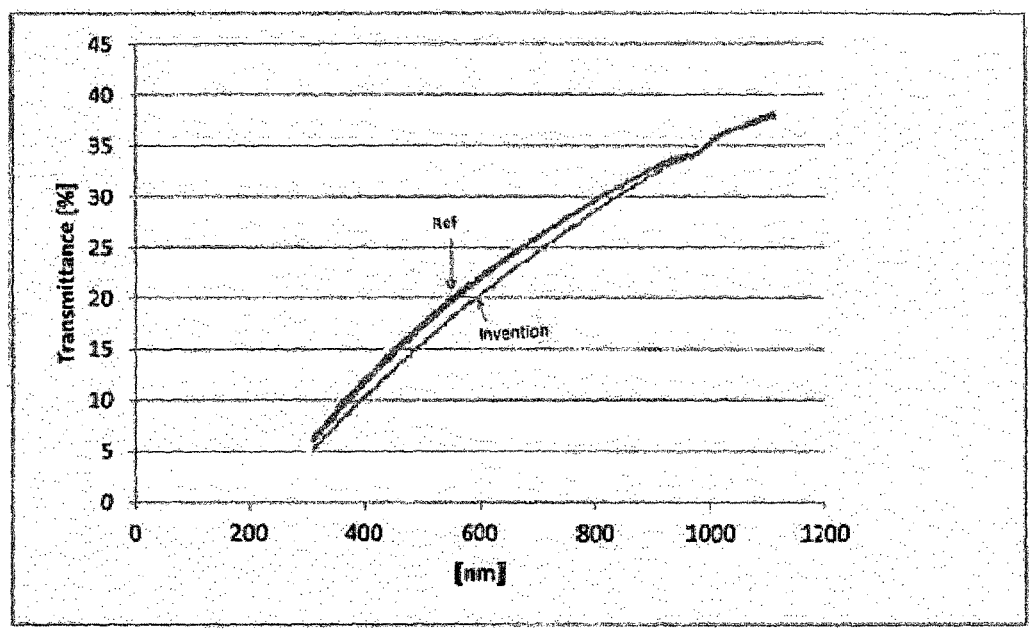
FIG. 1 shows transmission curves obtained for Reference samples and for samples representing the present invention.

When looking at the phase diagram for a three-phase system of water, it seems like the only way of decreasing the liquid water content in MFC slurries are lyophilisation, evaporation and supercritical drying. Since evaporation leads to irreversible agglomeration of MFC fibrils, lyofilization is energy demanding and time consuming, and supercritical drying gives water undesired properties, i.e. highly corrosive, the options for removing water effectively and satisfying without chemicals seems restricted. However, according to the present invention it was surprisingly found that the removal of water does not necessarily need to neither cross nor round the liquid-gas phase boarder in order to remove the water from the MFC slurry, while at the same time preserving the properties of the MFC fibrils. It was found that water transport from the MFC fibrils can take place in the liquid phase i.e. at ordinary ambient temperature and pressure by using absorbent materials. By remaining in the liquid phase, the irreversible hydrogen bond formation can be remarkably decreased whereby leaving intact MFC material with low water content.

Thus, the present invention provides a method for producing dewatered microfibrillated cellulose (MFC) comprising i) providing an aqueous MFC slurry,
ii) optionally dewatering said MFC slurry by mechanical means to provide a partly dewatered MFC slurry, and
iii) subjecting the MFC slurry or the partly dewatered MFC slurry to one or more drying operations by means of one or more absorbing materials to produce dewatered MFC.

The term "microfibrillated cellulose", also denoted MFC, as used in this specification includes microfibrillated/microfibrillar cellulose and nanofibrillated/nanofibrillar cellulose (NFC), which materials are also called nanocellulose, of the types described e.g. in the above discussed documents.

As described above MFC is prepared from cellulose source material, usually from woodpulp. Suitable pulps that may be used for the production of MFC include all types of chemical wood-based pulps, such as bleached, half-bleached and unbleached sulphite, sulphate and soda pulps. Also dissolving pulps having a low content, typically below 5%, of hemicelluloses can be used.

The MFC fibrils are isolated from the wood-based fibers using high-pressure homogenizers. The homogenizers are used to delaminate the cell walls of the fibers and liberate the microfibrils and/or nanofibrils. Pre-treatments are sometimes used to reduce the high energy consumption. Examples of such pre-treatments are enzymatic/mechanical pre-treatment and introduction of charged groups e.g. through carboxymethylation or TEMPO-mediated oxidation. The width and length of the MFC fibers vary depending on the specific manufacturing process. A typical width of MFC is from about 3 to about 100 nm, preferably from about 10 to about 30 nm, and a typical length is from about 100 nm to about 2 μm, preferably from about 100 to about 1000 nm.

The "absorbing material" used in the method of the present invention includes solid, water-insoluble materials which can be in the form of fibers, non-woven, fabrics, granules etc. Preferred materials are cellulosic materials, cotton, water-absorbent polymers, and especially superabsorbent polymers, and other materials with an ability to absorb high amounts of water.

Superabsorbent polymers (SAP) or hydrogels are water-insoluble hydrophilic polymers, able to swell and absorb amounts of water, saline solutions, or physiological fluids as high as 10-1000 times their own weight. They comprise polyelectrolytes or other highly hydrophilic polymeric matrices, usually bearing crosslinking sites along the macromolecular chains in order to avoid dissolution. These polymers generally contain carboxylic groups that are in equilibrium with their dissociated form in the presence of water or carboxylate groups. The polymer coils extend themselves and widen in consequence of the electrostatic repulsion of negative charges. Carboxylate groups are also able to interact through hydrogen bonding with additional quantities of water. The presence of crosslinking allows swelling of the three-dimensional network and gel formation without polymer dissolution.

A preferred SAP is a copolymeric network based on the partially neutralized acrylic acid (AA) or acrylamide (AM). Also other monomers, such as methacrylic acid, methacrylamide, acrylonitrile, 2-hydroxyethylmethacrylate, 2-acrylamido-2-methylpropane sulphonic acid, N-vinyl pyrrolidone, vinyl sulphonic acid and vinyl acetate, may be used.

Typically the SAPs are produced from acrylic monomers, preferably from acrylic acid, its sodium or potassium salt and acrylamide. The preparation may comprise simultaneous polymerization and crosslinking or crosslinking of a water-soluble prepolymer. A preferred di-functional cross-linker is N,N'-methylene bisacrylamide (MBA).

A benefit of the method of the present invention is that besides the absorbing material(s) no chemicals which could adversely affect the MFC, are needed in the drying operations and regeneration. Another benefit is that the drying operation can be conducted at ambient temperature and pressure.

The dry content of the MFC slurry is typically at most 6% by weight, preferably from 1 to 6% by weight, more preferably from 1 to 5% by weight, and most preferably from 1.5 to 4% by weight.

The optional dewatering of said MFC slurry by mechanical means to provide partly dewatered MFC slurry may be carried out by means of pressing, centrifugation or filtration, such as vacuum filtration.

The dry content of the partly dewatered MFC slurry is typically at most 20% by weight, preferably at most 18% by weight, more preferably at most 15% by weight, and most preferably from 5 to 15% by weight.

In a preferred embodiment the MFC slurry or the partly dewatered MFC slurry is contacted with an absorbing material, such as a superabsorbent polymer, to produce dewatered MFC. This drying operation may be repeated once or several times to obtain the desired dry content. Preferably the absorbing material, such as the superabsorbent material is applied to the surface of the MFC slurry or the partly dewatered MFC slurry.

In another preferred embodiment the MFC slurry or the partly dewatered MFC slurry is contacted with a first absorbing material and subsequently with a second absorbing material to produce dewatered MFC.

The first absorbing material may comprise a cellulosic material, such as filter paper. The drying operation may be affected in various modes, f.ex. by placing the MFC slurry or the partly dewatered MFC slurry between two sheets of cellulosic material, such as filter papers. This drying operation may be repeated once or several times to obtain the desired intermediate dry content. Said two sheets of cellulosic material, such filter papers, may be subjected to pressure by mechanical means to enhance the water removal.

The second absorbing material may comprise an absorbing material, such as a superabsorbent polymer as defined above This drying operation may be repeated once or several times to obtain the desired dry content. Preferably the absorbing material, such as the superabsorbent polymer is applied to the surface of the MFC slurry or the partly dewatered MFC slurry.

The dry content of the dewatered MFC is typically at least 20% by weight, preferably at least 25% by weight, more preferably at least 40% by weight, and most preferably at least 60% by weight. Such dry contents would drastically reduce the transportation costs compared to non-dewatered, i.e. never dried MFC.

In one embodiment the dewatering method is carried out on a moving substrate such that the MFC slurry or partly dewatered MFC slurry is placed on the substrate and moving along with the substrate to a drying section wherein the absorbing material is brought into contact with the MFC for a certain period of time whereafter the absorbing material is removed, and optionally this operation is repeated once or several times to produce dewatered MFC having the desired dry content.

In another embodiment the dewatering method is carried out on a moving substrate such that the MFC slurry or partly dewatered MFC slurry is placed on the substrate and moving along with the substrate to a first drying section wherein a first absorbing material is brought into contact with the MFC for a certain period of time whereafter the first absorbing material is removed and the substrate along with the obtained MFC slurry is moved to a second drying section wherein a second absorbing material is brought into contact with the MFC for a certain period of time whereafter the second absorbing material is removed to produce dewatered MFC. The described drying operations in the first drying section and/or in the second drying section can be repeated once or several times in order to produce dewatered MFC having the desired dry content.

According to the invention the removed absorbing material(s) can be regenerated and reused as absorbing material in the method. This regeneration can easily be made by drying the material, e.g. in an oven, at an elevated temperature for a period of time. The temperature should be chosen such that the material properties of the absorbing material are not deteriorated. Also other drying systems, such as infrared systems, can be used.

In a preferred embodiment the dewatered MFC obtained by the method of the invention can be redispersed in water without substantially deteriorating the material properties of the MFC.

The redispersibility of the dewatered MFC can be evaluated by means of viscosity and transmission measurements. When comparing the results obtained for a non-dewatered MFC and a dewatered and redispersed MFC the difference in viscosity or transmittance should not be more than 30%, preferably not more than 20%, i) when the viscosity is measured for a sample, ultrasonicated for 2 minutes, by a Brookfield viscometer RVDV-II+P with spindles V-72 at a shear rate of 5 rpm for 300 seconds, or ii) when the transmittance is measured for a sample having a 0.1% dry solid content and ultrasonicated for 2 minutes, by a UV-VIS spectrophotometer UV1800 from Shimadzu Corp., between 300 and 1100 nm.

DETAILED DESCRIPTION OF PREFERRED EMBODIMENTS

Figure 2:
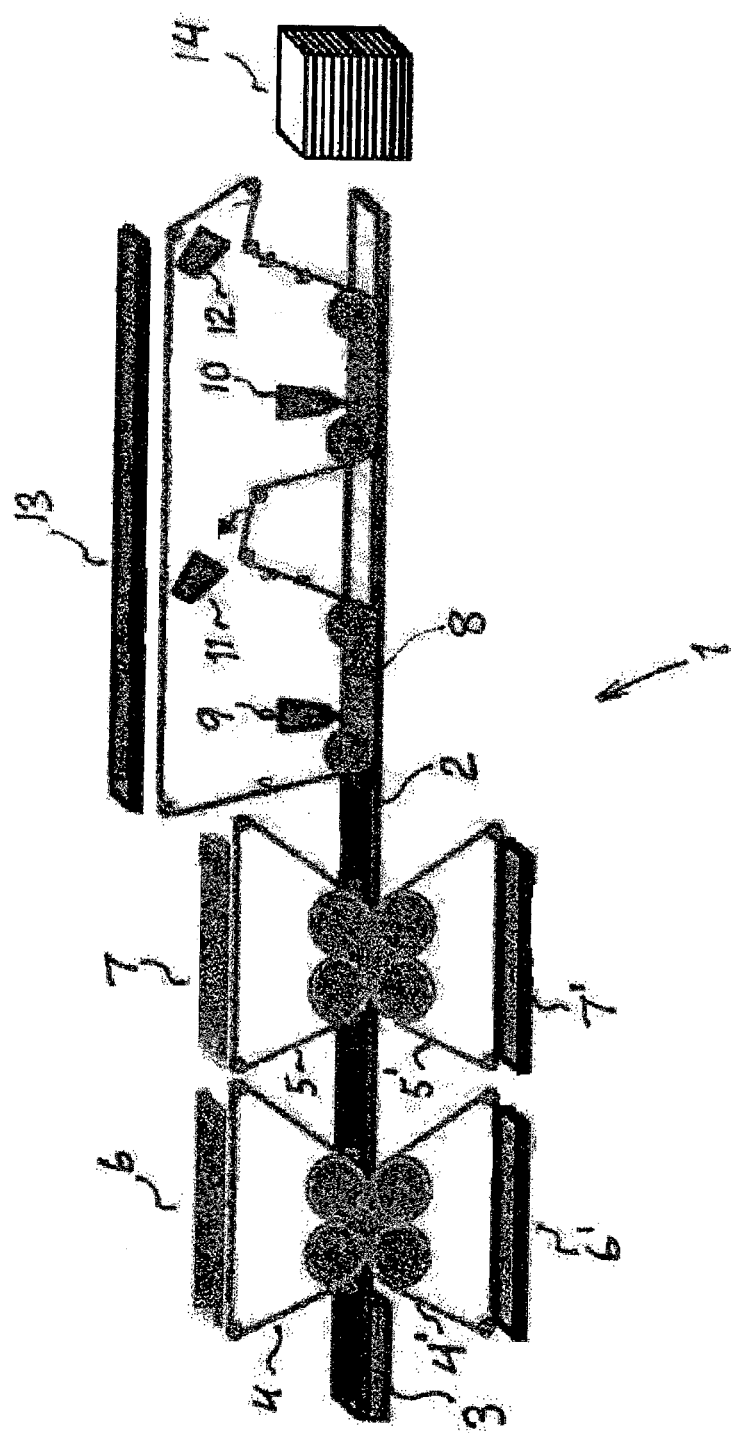
FIG. 2 shows a schematic drawing of an apparatus for carrying out the method of the present invention.

FIG. 2 shows an apparatus 1 for carrying out a method of producing dewatered MFC according to the present invention. A moving belt is marked with reference numeral 2. The MFC slurry in moved along with the belt 2. The first section of the apparatus is a filtration section 3 wherein free water is removed from the slurry. Thereafter the partly dewatered MFC slurry is placed between two primary hydrophilic membranes 4 and 4', and then placed between two intermediate hydrophilic membranes 5 and 5'. The membranes are regenerated in drying units 6, 6' and 7, 7', respectively. Then the MFC slurry with decreased water content is conducted to a section wherein the final absorption is affected by hydrophilic membrane 8 in the form of superabsorbents. Reference numerals 9 and 10 show regenerated inlet superabsorbents and numerals 11 and 12 outlet superabsorbents to be regenerated in drying unit 13. The dewatered MFC is stapled in form of sheets 14.

Methods

Viscosity

MFC samples were dispersed with deionized water to a dry solid content aim of 1.5% and a volume of 80 mL. Prior to viscosity measurement samples were ultrasonicated with Sonics® ultrasonic processor VCX 750 (Sonics & Materials Inc., Newtown, Conn., USA) for 1+1 min with intermediate stirring with a metal spatula. Afterwards the suspensions were cooled down in a water bath to 22±1° C. and occasionally stirred with the spatula to get a smooth suspension of stable temperature. A RVDV-II+P viscometer (Brookfield Engineering Laboratories Inc., Middleboro, Mass., USA)

with vane spindles V-72 (Brookfield Engineering Laboratories Inc., Middleboro, Mass., USA) were used for measuring the viscosity. This type of spindles showed a required torque of 10-100% in the measured shear rate range. Because of restricted amounts of samples, the spindle was immersed to half. The true value of the viscosity is thereby twice the measured values (Brookfield Engineering Laboratories Inc. operating manuals). The diameter of the 100 mL Schott Duran beaker (47.8 mm) was over twice the width of the bigger V-72 spindle (21.6 mm), which is required for reliable measurement values. Further on the clearance between the bottom of the beaker and the V-72 spindle was greater than the width of the spindle. After the spindle was immersed, the system was in rest for 1 min. Afterwards, the shear rates 0.5, 5, 10, 50 and 100 rpm were applied. 100 rpm was the highest measurable shear rate on the viscometer and the lowest shear rate was chosen to 0.5 rpm. The measuring times for 0.5, 5, and 10 rpm were chosen to 300 s, because they seemed more prone to be unstable. The higher shear rates showed quite stable viscosity values already after 100 s. After measuring the suspensions, they were stirred again with the metal spatula and left to stand for 40 min prior to the second measurement. Finally the dry solid content of the MFC slurries were checked by drying in a forced air oven at 105° C. to constant weight.

Transmittance

From the MFC slurry samples used for viscosity measurements with known dry solid content, 40 g of 0.1% dry solid content MFC was prepared by adding high purity water (resistivity at 21° C.≥16.5 Mohm cm). High purity water was used to minimize amount of impurities and 0.1% concentration was used since it was suitable for the transmittance range for all samples. The suspensions were stirred with a magnetic stirrer for 10 min at 300 rpm. Afterwards they were ultrasonicated with Sanies® ultrasonic processor VCX 750 (Sanies & Materials Inc., Newtown, Conn., USA) for 1+1 min with intermediate and final magnetic stirring for 0.5 min at 300 rpm. The transmittance was measured between 300-1100 nm using a UV-VIS spectrophotometer UV-1800 (Shimadzu Corp., Kyoto, Japan). The extended wavelength range compared to Johnson et al. (2009 *Cellulose*, 16, pp. 227-238) was chosen, because of more data was obtained with the same amount of sample preparation. The cuvette used was rinsed and measured as blank with high purity water. The path-length of the cuvette was 1 cm. Afterwards the cuvette was rinsed and filled with the MFC sample to be measured. Three measurements were conducted per sample. The second and the third measurement were performed 5 and 10 min from the start of the first measurement respectively.

Example 1

Microcrystalline cellulose (MCC)-water mixture prepared as described in WO 2011/154601 was used as a starting material. The starting MFC slurry was made from this MCC-water mixture by three passes through a Microfluidizer M-110P (Microfluidics Corporation) at an operating pressure 2000 bar. As a reference was used this starting MFC slurry as such (without any water removal).

Superabsorbent polymer (SAP) was prepared by free-radical polymerization from acrylic acid (20%) by using 2,2'-azobis[2-(2-imidazolin-2-yl)propane]dihydrochloride (VA-044) as free-radical initiator and N,N'-methylene bisacrylamide (MBA) as crosslinking agent. The obtained acid polymer was neutralized with sodium hydroxide to form poly(sodium acrylate) such that about 72% of the acid groups were converted to sodium carboxylate groups.

Water was removed from MFC slurries by absorbing materials using filter papers (Whatman filter paper) and the above superabsorbent polymer (SAP), grade High N,N'-methylene bisacrylamide (MBA). The starting MFC slurry was filtrated to remove free water, after which the wet MFC-water retentate was placed between two filter papers for 10-15 min. When the filter papers had absorbed water out of the retentate, the papers were transferred to an oven to evaporate the water. The partially dried MFC retentate was placed between a new set of filter papers. By repeating this procedure three times, with oven dried filter papers and increasing the pressure on the absorbing system by a load, a final dry content of 24.20% was achieved. This dry content ensured a smooth and tough surface, suitable for absorption by the superabsorbent polymer (SAP). The polymer granules were applied directly on the surface of the MFC. The absorption by SAP polymer was conducted for half an hour, whereby the SAP polymer was removed by peeling of and dried in oven. This procedure was performed two times with the regenerated SAP polymer for the second absorption to achieve a final dry content of 61.23%.

Redispersibility was evaluated by viscosity and transmittance measurements which were conducted as described above.

Viscosity results are shown in following table.

TABLE 1

|  |  |  |  | rpm | | | | |
|---|---|---|---|---|---|---|---|---|
|  |  |  |  | 0.5 | 5 | 10 | 50 | 100 |
| Ref. | 22° C. | #1 | mPas | 101868 | 11988 | 6526 | 2962 | 1494 |
|  | Ultrasonication |  | % torque | 22.4 | 27 | 29.4 | 66.4 | 67.1 |
|  | Spindel 72.Half | #2 | mPas | 88800 | 11456 | 6038 | 2576 | 1354 |
|  | Dry solid cont. 1.56% |  | % torque | 20 | 25.8 | 27.2 | 58 | 60.9 |
| Inv. | 22° C. | #1 | mPas | 90132 | 14386 | 7170 | 2096 | 1632 |
|  | Ultrasonication |  | % torque | 20.1 | 32.3 | 32.3 | 47.2 | 73.5 |
|  | Spindel 72.Half | #2 | mPas | 134532 | 16784 | 8548 | 2616 | 1674 |
|  | Dry solid cont. 1.51% |  | % torque | 30.3 | 37.6 | 38.5 | 58.9 | 75.4 |

Since viscosity correlates well with the degree of agglomerated particle, the results show good redispersibility.

Peak transmittance variation between first, second and third measurements are shown in following table.

TABLE 2

|  |  | Wavelength [nm] | Variation [%] |
|---|---|---|---|
| Reference | #1 vs #2 | 348 | 2.4 |
|  | #1 vs. #3 | 356 | 6.03 |
| Invention | #1 vs #2 | 346 | 3.51 |
|  | #1 vs #3 | 360 | 6.24 |

The results of the transmittance measurements are shown in FIG. 1. The transmittance curves obtained for the Reference samples (not subjected to dewatering) and for the samples representing the present invention (subjected to dewatering and redispersion) are very similar.

Since transmittance correlates well with the degree of agglomerated particles, the results show good redispersibility.

The invention claimed is:

1. A method for producing dewatered microfibrillated cellulose (MFC) comprising:
   i) providing an aqueous MFC slurry,
   ii) optionally dewatering said MFC slurry by mechanical means to provide a partly dewatered MFC slurry, and
   iii) subjecting the MFC slurry or the partly dewatered MFC slurry to one or more drying operations by contacting the MFC slurry or the partly dewatered MFC slurry with one or more absorbing materials comprising superabsorbent polymer to produce dewatered MFC, wherein the one or more drying operations is done at ambient temperature and pressure and wherein the one or more drying operations prevents agglomeration of the MFC to obtain the dewatered MFC which is redispersible.

2. The method of claim 1 wherein the MFC slurry or the partly dewatered MFC slurry is contacted with a first absorbing material and subsequently with a second absorbing material to produce dewatered MFC.

3. The method of claim 2 wherein the first absorbent material comprises a cellulosic material.

4. The method of claim 2 wherein the second absorbing material comprises a superabsorbent polymer.

5. The method of claim 1 wherein the drying operation is repeated at least once.

6. The method of claim 1 wherein the dry content of the MFC slurry is at most 6% by weight.

7. The method of claim 1 wherein dry content of the partly dewatered MFC slurry is at most 20% by weight.

8. The method of claim 1 wherein dry content of the dewatered MFC is at least 20% by weight.

9. The method of claim 1 wherein the method is carried out on a moving substrate such that the MFC slurry or partly dewatered MFC slurry is placed on the substrate and moving along with the substrate to a drying section wherein the absorbing material is brought into contact with the MFC whereafter the absorbing material is removed and optionally this operation is repeated to produce dewatered MFC.

10. The method of claim 1 wherein the method is carried out on a moving substrate such that the MFC slurry or partly dewatered MFC slurry is placed on the substrate and moving along with the substrate to a first drying section wherein a first absorbing material is brought into contact with the MFC whereafter the first absorbing material is removed and the substrate along with the obtained MFC slurry is moved to a second drying section wherein a second absorbing material is brought into contact with the MFC whereafter the second absorbing material is removed to produce dewatered MFC.

11. The method of claim 1 wherein the one or more absorbing materials are regenerated and reused as absorbing material.

* * * * *